(12) United States Patent
Singh et al.

(10) Patent No.: US 12,259,880 B2
(45) Date of Patent: *Mar. 25, 2025

(54) VISUALIZATION TOOL FOR BUILDING NESTED QUERIES

(71) Applicant: Oracle International Corporation, Redwood Shores, CA (US)

(72) Inventors: Prashant Singh, Lexington, MA (US); Rasika Vaidya Kaura, Dublin, CA (US); Henrik Michael Ammer, Auburn, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/598,230

(22) Filed: Mar. 7, 2024

(65) Prior Publication Data

US 2024/0211472 A1    Jun. 27, 2024

Related U.S. Application Data

(63) Continuation of application No. 17/449,628, filed on Sep. 30, 2021, now Pat. No. 11,947,527.

(60) Provisional application No. 63/200,474, filed on Mar. 9, 2021, provisional application No. 63/155,817, filed on Mar. 3, 2021, provisional application No. 63/148,864, filed on Feb. 12, 2021, provisional application No. 63/147,564, filed on Feb. 9, 2021.

(51) Int. Cl.
| | | |
|---|---|---|
| G06F 16/242 | (2019.01) | |
| G06F 3/0482 | (2013.01) | |
| G06F 3/0486 | (2013.01) | |
| G06F 16/2453 | (2019.01) | |
| G06F 16/2458 | (2019.01) | |
| G06F 16/248 | (2019.01) | |
| G06F 16/25 | (2019.01) | |

(52) U.S. Cl.
CPC ........ *G06F 16/2428* (2019.01); *G06F 3/0482* (2013.01); *G06F 3/0486* (2013.01); *G06F 16/24535* (2019.01); *G06F 16/2458* (2019.01); *G06F 16/248* (2019.01); *G06F 16/258* (2019.01); *G06F 2203/04803* (2013.01)

(58) Field of Classification Search
None
See application file for complete search history.

(56) References Cited

U.S. PATENT DOCUMENTS

| | | |
|---|---|---|
| 9,330,139 B2 | 5/2016 | Chen et al. |
| 10,275,493 B1 | 4/2019 | Mostak |

(Continued)

FOREIGN PATENT DOCUMENTS

CN    112236765 A    1/2021

*Primary Examiner* — Giuseppi Giuliani
(74) *Attorney, Agent, or Firm* — Invoke

(57) ABSTRACT

Techniques for generating an interactive visualization tool for building nested queries are disclosed. The interactive nested query visualization tool allows a user to observe, analyze, and modify query characteristics and attributes of a set of nested queries. A system displays an interactive visual depiction of a set of nested queries. Visual representations of the nested queries are positioned relative to each other based on the relationships between the nested queries. The system displays, simultaneously with the set of nested queries, editable fields for a selected query. The system modifies a functionality of a user interface based on which of the nested queries is selected.

20 Claims, 10 Drawing Sheets

(56) References Cited

U.S. PATENT DOCUMENTS

| | | |
|---|---|---|
| 10,331,899 B2 | 6/2019 | Pattabhiraman et al. |
| 10,341,172 B1 | 7/2019 | Vanden et al. |
| 10,592,506 B1 | 3/2020 | Thombre et al. |
| 10,817,576 B1 | 10/2020 | Davidovich et al. |
| 11,030,192 B2 | 6/2021 | James et al. |
| 11,216,511 B1 | 1/2022 | Bigdelu et al. |
| 11,263,268 B1 | 3/2022 | Bourbie et al. |
| 11,636,128 B1 | 4/2023 | Bigdelu et al. |
| 11,644,955 B1 | 5/2023 | Singamneni et al. |
| 2004/0243799 A1 | 12/2004 | Hacigumus et al. |
| 2005/0015361 A1 | 1/2005 | Payton et al. |
| 2006/0074878 A1 | 4/2006 | Miller |
| 2006/0235828 A1 | 10/2006 | Dettinger et al. |
| 2007/0136239 A1 | 6/2007 | Lee et al. |
| 2008/0243772 A1 | 10/2008 | Fuxman et al. |
| 2009/0055367 A1 | 2/2009 | Colgrave et al. |
| 2010/0161646 A1 | 6/2010 | Ceballos et al. |
| 2013/0247207 A1 | 9/2013 | Hugard et al. |
| 2013/0290294 A1 | 10/2013 | Fuller et al. |
| 2014/0189548 A1 | 7/2014 | Werner |
| 2014/0229462 A1 | 8/2014 | Lo |
| 2015/0120776 A1 | 4/2015 | Gopalan et al. |
| 2015/0378693 A1 | 12/2015 | Boag et al. |
| 2016/0140166 A1 | 5/2016 | Schechter et al. |
| 2017/0193127 A1 | 7/2017 | Chen et al. |
| 2017/0337232 A1 | 11/2017 | Caspi et al. |
| 2018/0032574 A1 | 2/2018 | Vandenberg |
| 2018/0089263 A1 | 3/2018 | Gerard |
| 2018/0089265 A1 | 3/2018 | Gerard |
| 2019/0188203 A1 | 6/2019 | James et al. |
| 2020/0073983 A1 | 3/2020 | Sen et al. |
| 2020/0342018 A1 | 10/2020 | Lange et al. |
| 2021/0034621 A1 | 2/2021 | Patel et al. |
| 2021/0124781 A1 | 4/2021 | Tabb et al. |
| 2021/0173851 A1 | 6/2021 | Dorne et al. |
| 2022/0329616 A1 | 10/2022 | O'Hearn et al. |

FIG. 5

VISUALIZATION TOOL FOR BUILDING NESTED QUERIES

INCORPORTION BY REFERENCE DISCLAIMER

Each of the following applications are hereby incorporated by reference: application Ser. No. 17/449,628 filed on Sep. 30, 2021; Application 63/147,564, filed Feb. 9, 2021; Application 63/148,864, filed Feb. 12, 2021; Application 63/155,817, filed Mar. 3, 2021; Patent Application 63/200,474, filed Mar. 9, 2021. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to a visualization tool for building nested queries. In particular, the present disclosure relates to a system and user interface including an interactive visual representation of a set of nested queries.

BACKGROUND

Database systems store vast amounts of data that is accessible by end users. To generate actionable information from the data stored in the database system, users execute queries that filter records returned from the database system to only those records applicable to the user. For example, a user may generate a query to retrieve only records from a defined object having defined values for a defined attribute. Often, queries are written with multiple layers of sub-queries, each layer performing one or both of filtering data from a sub-query lower in the hierarchy and filtering data from an object in the database. The sub-queries output attribute data to parent queries. Complex queries may include many layers of nested sub-queries. Each sub-query may include multiple data retrieval operations from one or more objects and/or multiple operations to filter retrieved data prior to outputting the data. As a result of multiple and complex nested relationships between queries, and multiple operations performed by each query, complex queries may appear unintelligible to anyone other than the author of a query.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 5 illustrates an example embodiment for showing the JavaScript Object Notation (JSON) format data;

DETAILED DESCRIPTION

Figure 1:
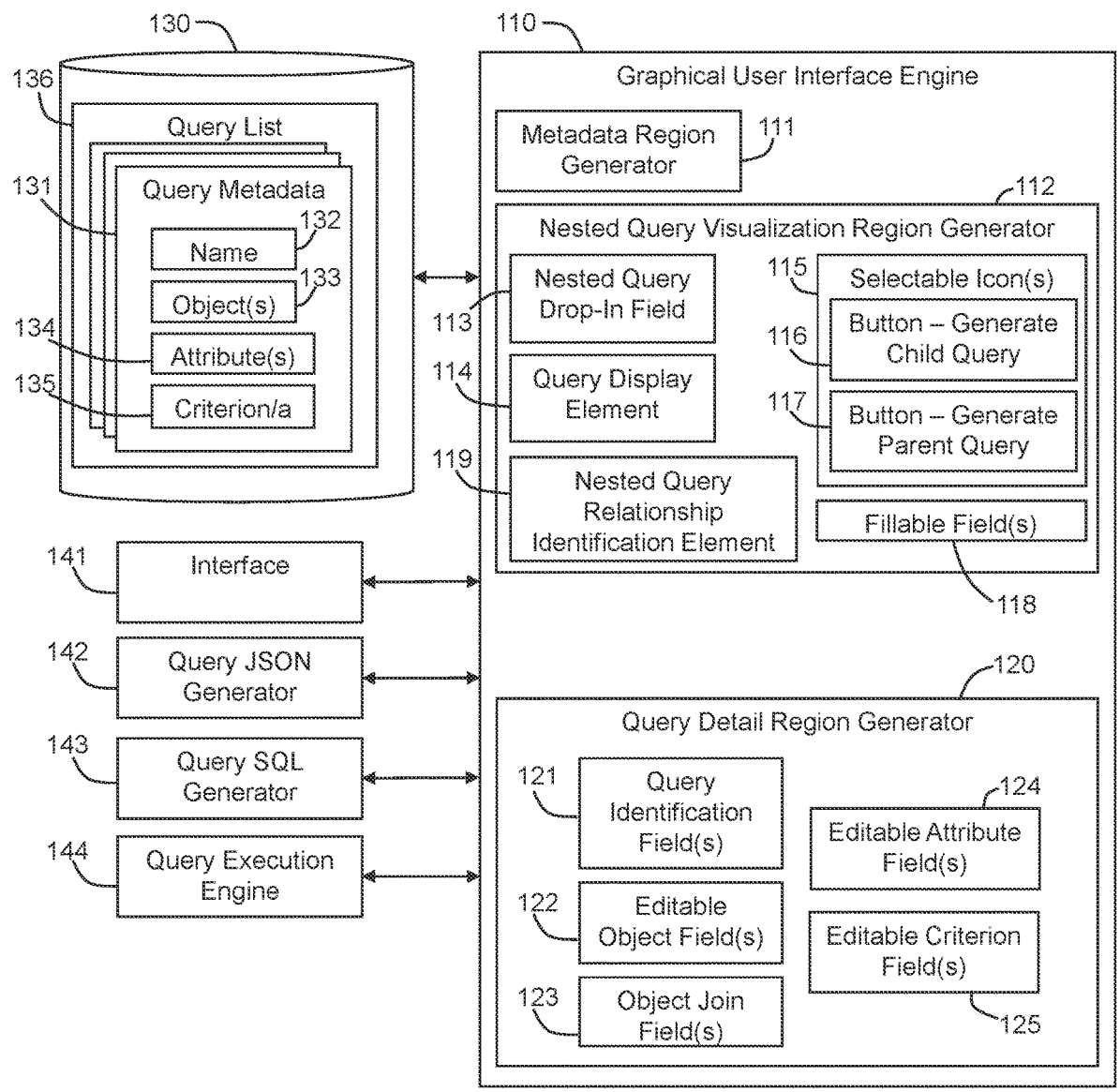
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview
2. System Architecture
3. Generating New Queries in a Set of Nested Queries
4. Creating New Parent and Child Queries in a Nested Query Display
5. Creating New Query by Joining Object to Existing Query
6. Presenting Editable Fields for Nested Queries
7. Generating New Queries Using Selectable Metadata
8. Computer Networks and Cloud Networks
9. Miscellaneous; Extensions
10. Hardware Overview

1. General Overview

One or more embodiments implement an interactive query builder for a compound query with nested sub-queries. The interactive query builder allows a user to observe, analyze, and modify query characteristics and attributes of a set of nested sub-queries. The system displays an interactive visual depiction of the set of nested sub-queries. The interactive visual depiction includes visual representations of each of the set of nested sub-queries. The visual representations of the nested sub-queries are positioned relative to each other based on the relationships between the nested sub-queries. Accordingly, the interactive visual depiction indicates, via positioning of the visual representations, the relationships between the nested sub-queries.

In one or more embodiments, the system displays user interface elements in the interactive visual depiction of the set of sub-queries. Examples herein refer to specific types of user interface elements such as buttons, icons, and checkboxes. However, these examples are equally applicable to any other type of user interface element. In one example, buttons are overlayed on the visual representations of each of the nested sub-queries. User selection of a button, associated with a visual representation of a particular query, may result in the creation of a parent query of the particular query. User selection of another button, associated with the visual representation of the particular query, may result in the creation of a child query of the particular query. A parent query may be defined, for example, as a query that uses results from the execution of a corresponding child query. Yet another type of button may trigger the system to join another data object to an existing sub-query.

In addition, or in the alternative, the system displays fields for entering values to modify one or more sub-queries. In one or more embodiments, the interactive query builder includes a query detail region alongside the nested query region. The query detail region has editable fields for modifying attributes, values, and criteria of a selected query.

In one or more embodiments, the system may modify one or more sub-queries responsive to detection of a drag-and-drop action in a user interface. The interactive query builder includes representations of query metadata that can be dragged-and-dropped into a nested query region to generate queries with automatically-generated characteristics based on the selected query metadata.

In one or more embodiments, the system generates JSON code based on the visual user interface of the set of queries. The system converts the JSON code to SQL code. The system may display to the user with a preview of one or both of the JSON code and the SQL code prior to executing the SQL code.

One or more embodiments described in this Specification and/or recited in the claims may not be included in this General Overview section.

2. Architectural Overview

FIG. 1 illustrates a system 100 in accordance with one or more embodiments. As illustrated in FIG. 1, system 100 includes a graphical user interface (GUI) engine 110, a data repository 130, an interface 141, a query JSON generator 142, a query SQL generator 143, and a query execution engine 144.

The GUI engine 110 includes a query template region generation 111, a nested query visualization region generator 112, and a query detail region generator 120. The query template region generator 111 obtains query metadata 131 from the data repository 130.

In one or more embodiments, the query metadata 131 includes a list 136 of query templates having different characteristics. Examples of query characteristics included in the metadata include a query name 132, an object 133 associated with the query, attributes 134 input to/output from/operated on by the query, and other criteria 135 defining values obtained by the query. Examples of criteria include operands to be applied to attributes when the query is executed and ranges of values for attributes to be returned when the query is executed.

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the graphical user interface engine 110. Alternatively, or additionally, a data repository 130 may be implemented or executed on a computing system separate from the graphical user interface engine 110. A data repository 130 may be communicatively coupled to the graphical user interface engine 110 via a direct connection or via a network.

Information describing query metadata 131 may be implemented across any of components within the system 100. However, this information is illustrated within the data repository 130 for purposes of clarity and explanation.

The nested query visualization region generator 112 generates a nested query visualization region. The nested query visualization region may include, for example, a nested query drop-in field 113. The nested query visualization region generator 112 generates a nested query responsive to detecting a drag-and-drop action of the interface 141. In one or more embodiments, the nested query visualization region includes a visual representation of a query 114. A visual representation of a query 114 may be, for example, a geometric shape, such as a rectangle. The name of the query may be displayed in the geometric shape. In one or more embodiments, selectable buttons 115 are displayed in the visual representation of a query 114. Examples of selectable buttons include a button 116 to generate a child query from the selected query and a button 117 to generate a parent query to the selected query. Other examples include a "details" button, a drop-down menu, and an "edit" button. In one or more embodiments, the visual representation of a query 114 has fillable fields 118 displayed inside the visual representation of a query 114. Examples of fillable fields include a field to edit a query name, to edit an object name associated with the query, to enter attribute names associated with the query, or to enter one or more criteria associated with the query.

In one or more embodiments, a nested query relationship identification element 119 displays a visual representation of a nested relationship between two queries. For example, in an embodiment in which the queries are displayed as geometric shapes, one geometric shape may be arranged relative to the other to indicate a nested relationship. For example, each child query may be offset by its parent query by a pre-defined distance. Examples of nested query relationship identification elements include offsets, spatial relationships between queries, buttons identifying a query as one or both of a parent/child, and color-coding queries.

The query detail region generator 120 generates a query detail region for a selected query. For example, the nested query visualization region generator 112 may display a set of nested queries as geometric shapes. Responsive to detecting a user selection of one of the nested queries, the query detail region generator 120 displays alongside the nested query drop-in field 113 additional fields containing further detail regarding characteristics of the selected query. Query identification fields 121 include, for example, a query name, a name of query metadata used to generate the query, and a unique identifier for the query.

The editable object field 122 is an editable field occupied by the name of the object or objects accessed by the query upon execution of the query. In one or more embodiments, the editable object field 122 includes a drop-down menu or list of selectable objects. In one or more embodiments, the editable object field 122 receives inputs to type or enter an object name, or a portion of an object name, and the query detail region generator 120 searches the objects accessible by the query execution engine 144 to determine if there is a matching object.

The "object join" field 123 receives an input to select one or more additional objects to be added to the selected query. In one or more embodiments, when the system 100 detects a selection of an additional object to be added to the query, the nested query visualization region generator 112 automatically generates a representation of a new child query associated with the selected query.

The editable attribute field 124 receives an input to select attributes that will affect the output of the query. For example, if an object associated with the query includes five attribute fields, the editable attribute field 124 may include a drop-down menu or list of the five attributes stored by the object. The editable attribute field 124 may receive a selection of one or more of the attributes that will be retrieved, excluded, or operated on to generate a query output.

The editable criterion field 125 receives an input to select one or more criteria to be applied to objects, attributes, and/or attribute values to return one or more output values from the query. For example, the editable criteria field 125 may receive an input to include two attribute values and a Boolean AND operator as a criterion to return only records from an object having both of the selected attribute values.

The system 100 includes an interface 141 to allow a user to interact with the graphical user interface engine 110. In one or more embodiments, interface 141 refers to hardware and/or software configured to facilitate communications between a user and the graphical user interface engine 110. Interface 141 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 141 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 141 is specified in one or more other languages, such as Java, C, or C++.

A query JSON generator 142 renders the set of nested queries displayed by the nested query visualization region generator as JSON data format prior to executing the queries. As the graphical user interface engine 110 adds nested queries and modifies characteristics of the queries, the query JSON generator 142 updates the JSON data accordingly. In one or more embodiments, the graphical user interface engine 110 includes a button to display the JSON data format associated with a selected nested query.

A query SQL generator 143 generates the nested queries in SQL language. In one or more embodiments, the graphical user interface engine 110 includes a button to display the SQL code associated with a selected nested query. In one or more embodiments, the SQL generator 143 generates the SQL code associated with a selected query without generating the SQL code for a parent query and/or a child query of the selected query. The JSON data format is agnostic to the particular SQL database format for any particular SQL database system. Accordingly, a set of nested queries visualized by the graphical user interface engine 110 may be converted from a JSON data format into multiple different SQL database formats or dialects. For example, the query SQL generator 142 may convert the same set of JSON data associated with a particular nested query into the Microsoft SQL Server dialect, the Oracle SQL dialect, the MySQL dialect, the PostgreSQL dialect, or any other SQL dialect associated with a particular database system.

A query execution engine 144 executes the nested queries by executing the SQL code to return records from one or more databases. In one or more embodiments, the graphical user interface engine 110 includes a button to execute the SQL code associated with a selected nested query without executing the SQL code associated with a parent and/or child query.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 8, titled "Computer Networks and Cloud Networks."

In one or more embodiments, the graphical user interface engine 110 refers to hardware and/or software configured to perform operations described herein for displaying query metadata, displaying a set of nested queries, and displaying a query detail region for a selected query among the set of nested queries. Examples of operations for displaying and modifying a set of nested queries are described below with reference to the figures that follow.

In an embodiment, the graphical user interface engine 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Generating New Queries in a Set of Nested Queries

Figure 2:
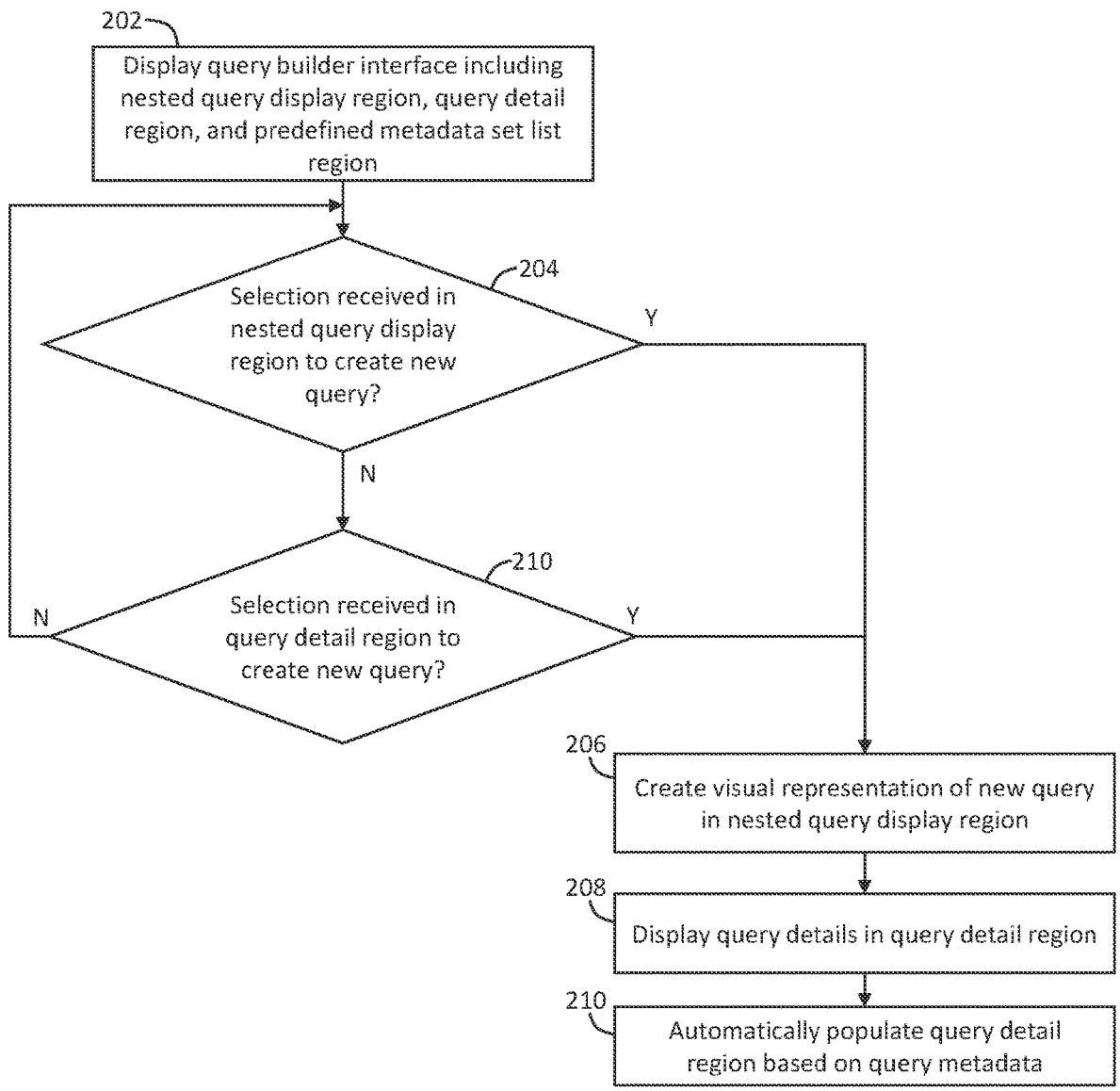
FIG. 2 illustrates an example set of operations for creating and displaying sub-queries in a display of nested queries in accordance with one or more embodiments.

FIG. 2 illustrates an example set of operations for generating sub-queries in a set of nested queries in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In one or more embodiments, a system displays a query builder user interface (Operation 202). The user interface includes a nested query display region and a query detail region. The nested query display region may be adjacent to, and non-overlapping with, the query detail region. The nested query display region may display a set of nested queries. The set of nested queries may be displayed as a set of distinct visual representations arranged relative to each other to convey a parent/child relationship among the queries.

For example, in one embodiment, each query of a set of nested queries is displayed as a geometric shape on a background. Each geometric shape may be separate from each other geometric shape. The geometric shapes may be separated from each other by a contiguous region of the background, unbroken by connecting elements, such as lines. Instead, a parent/child relationship may be conveyed by the location of each geometric shape relative to each other geometric shape. For example, each child query may be represented as a geometric shape that is arranged below, and indented to the right of, a geometric shape representing its respective parent query. The geometric shape representing the child query may overlap the shape representing the parent query in the horizontal direction without overlapping the shape representing the parent query in the vertical direction. A shape representing a child query may be indented by a pre-defined distance—such as 1.27 centimeters or 0.5 inches. Alternatively, the shape representing the child query may be indented by a certain percentage of the length of the shape. For example, the shape representing the child query may overlap the shape of the parent query along 80% of the length of shape of the parent query.

The query detail region may include a set of editable fields associated with a particular query in the nested query display region. The query detail region may display a set of characteristics associated with a query. The set of characteristics may include a name of a query, a data object associated with the query, a description of the query, output attributes of the query, and criteria associated with the output attributes of the query. The visual representation of the query in the nested query display region may display a sub-set of the set of characteristics. For example, the visual representation of the query in the nested query display region may display only a name of the query. In addition, the visual representation of the query in the nested query display region may not include an editable field.

In one or more embodiments, the query builder interface further includes a third region displaying a list of predefined sets of metadata. The predefined sets of metadata correspond to predefined modifications to existing queries, or to new queries. For example, one set of metadata may specify a data object and a data attribute pertaining to the data object. Another set of metadata may specify one or more functions to be performed by a query on a set of retrieved data.

The system determines whether a selection is received in the nested query display region to create a sub-query (Operation 204). For example, in one embodiment, the nested query display region includes an interface element that, when selected, generates a child query from a selected query. In addition, or in the alternative, the nested query display region may include an interface element that, when selected, generates a parent query to the selected query. In one embodiment, the interface element is a displayed icon, button, or symbol located within a shape representing a sub-query in the nested query display region. For example, a particular sub-query may be represented by a rectangle shape. The interface element may include one or both of a "parent query" button and a "child query" button located within the rectangle shape.

In another embodiment, the system may detect a drag-and-drop operation performed by a user interacting with the user interface. For example, the user may drag-and-drop a symbol representing a predefined set of metadata into the nested query display region from a region displaying a list of sets of metadata.

If the system detects the selection in the nested query display region to create a new sub-query, the system generates a visual representation of the new sub-query in the nested query display region (Operation 206). Displaying the new sub-query includes arranging the new sub-query relative to other queries already displayed in the nested query display region. For example, if the new query is a parent query, the system may display the new query above a designated child query and indented to the left of the designated child query. If the new query is a child query, the system may display the new query below a designated parent query and indented to the right of the designated parent query.

In addition to generating the visual representation of the new query, the system displays details for the new query in the query detail region (Operation 208). In one embodiment, the system displays details for only one sub-query at a time, from among the set of nested queries displayed in the nested query display region, in the query detail region. Accordingly, if query details for another query were previously displayed in the query detail region prior to the creation of the new sub-query, the system may stop displaying the details for the previously-selected sub-query and may display only details for the new query.

The query details displayed in the query detail region may include a set of query characteristics and editable fields for specifying values associated with the query characteristics. The query characteristics may include, for example, a query name, a data object associated with the query, a description of the query, output attributes associated with the query, and criteria for filtering the attributes retrieved by the query.

In one embodiment, the query detail displays a set of query characteristics, and the visual representation of the corresponding query in the nested query display region displays a sub-set of the set of query characteristics. For example, the visual representation of the query in the nested query display region may display only a query name, among the query characteristics.

In one embodiment, the system changes the functionality of the query builder interface by changing the information available to a user depending on the query selected in the nested query display region. For example, if the nested query display region includes a parent query and a child query, then a user may not be able to modify query characteristics for the parent query when the child query is selected. Similarly, the user may not be able to modify query characteristics for the child query when the parent query is selected. In addition, when the parent query is selected in the nested query display region, the user interface may display only the query information for the child query that is included in the visual representation of the child query. The user interface may not display the entire set of query characteristics that would be visible if the child query were selected. Similarly, when the child query is selected in the nested query display region, the user interface may display only the query information for the parent query that is included in the visual representation of the parent query. The user interface may not display the entire set of query characteristics that would be visible if the parent query were selected. For example, if the child query is selected, the user interface may display only a name of the parent query in the nested query display region. The system may display no characteristics specific to the parent query in the query detail region. However, if the system detects a user selection of the parent query, the user interface may display both the name of the parent query in the nested query display region and the additional set of query characteristics in the query detail region.

In one embodiment, the system automatically populates the query detail region with values for defining the query based on pre-defined query metadata (Operation 210). For example, when the system detects a selection to create a child query, the system may: (1) obtain information regarding a data object that is to be acted upon by the child query, and (2) automatically modify attributes of the parent query based on output attributes of the new child query. Obtaining the information regarding the data object may be performed automatically by the system or based on user input. For example, the system may prompt a user to identify a data object and one or more attributes of the data object, as well as one or more criteria to be applied to the attributes to execute the query. Alternatively, or in addition, the system may identify a default data object and attributes.

In one embodiment, the system detects a drag-and-drop operation of a set of metadata from a list of selectable sets of metadata. The set of metadata may specify one or more: (a) data objects, (b) attributes of the data objects, and (c) criteria to be applied to the attributes, to execute a new query.

According to another example, when the system detects a selection to create a parent query, the system may automatically modify attributes of the new parent query based on output attributes of the existing child query. According to yet another example, when the system detects a selection to create a query that is both a parent query of an existing query and a child query of a separate existing query, the system may automatically modify attributes of the new query based on attributes of the existing child query. The system may also automatically modify attributes of the existing parent query based on attributes of the new query.

If the system does not detect a selection to create a new query in the nested query display region, the system determines whether a selection has been received in the query detail region to create a new query (Operation 210). For example, in one embodiment, the query detail region includes, in addition to query characteristics, an editable field for specifying a data object or query template. The system may initiate generating a new query based on detecting a user interaction with the editable field. In one embodiment, a user may type a data object name into the field to generate a new query for acting on the data object. In another embodiment, the system may detect a drag-and-drop action of a predefined set of metadata specifying query characteristics for a new query.

If the system detects a selection in the query detail region to generate a new query, the system creates a visual representation of the new query in the nested query display region (Operation 206). The system may also display query details in the query detail region (Operation 208) and automatically populate the query detail region based on query metadata (Operation 210).

In one embodiment, the nested queries in the nested query display region define a compound query. As the structure of the compound query is created in the nested query display region, and as the characteristics of the compound query are specified in the query detail region, the system generates JSON data describing the compound query. The JSON data may be SQL-database-agnostic. The system may use the same JSON data to generate SQL-database code for multiple different SQL databases having different SQL dialects.

4. Creating New Parent and Child Queries in a Nested Query Display

Figure 3A:
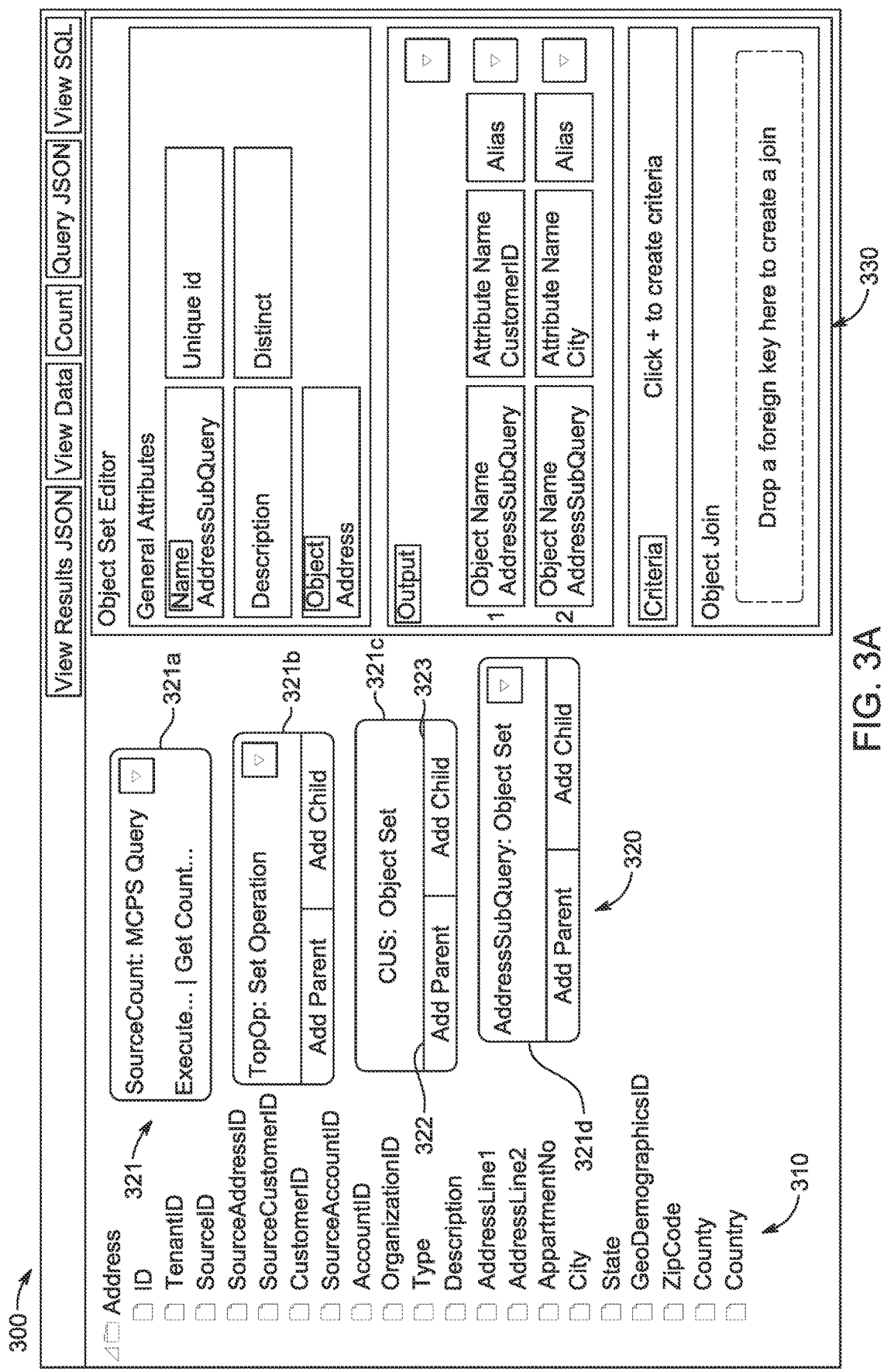
FIGS. 3A and 3B illustrate an example embodiment of creating and displaying a sub-query responsive to an input to another sub-query.
Figure 3B:
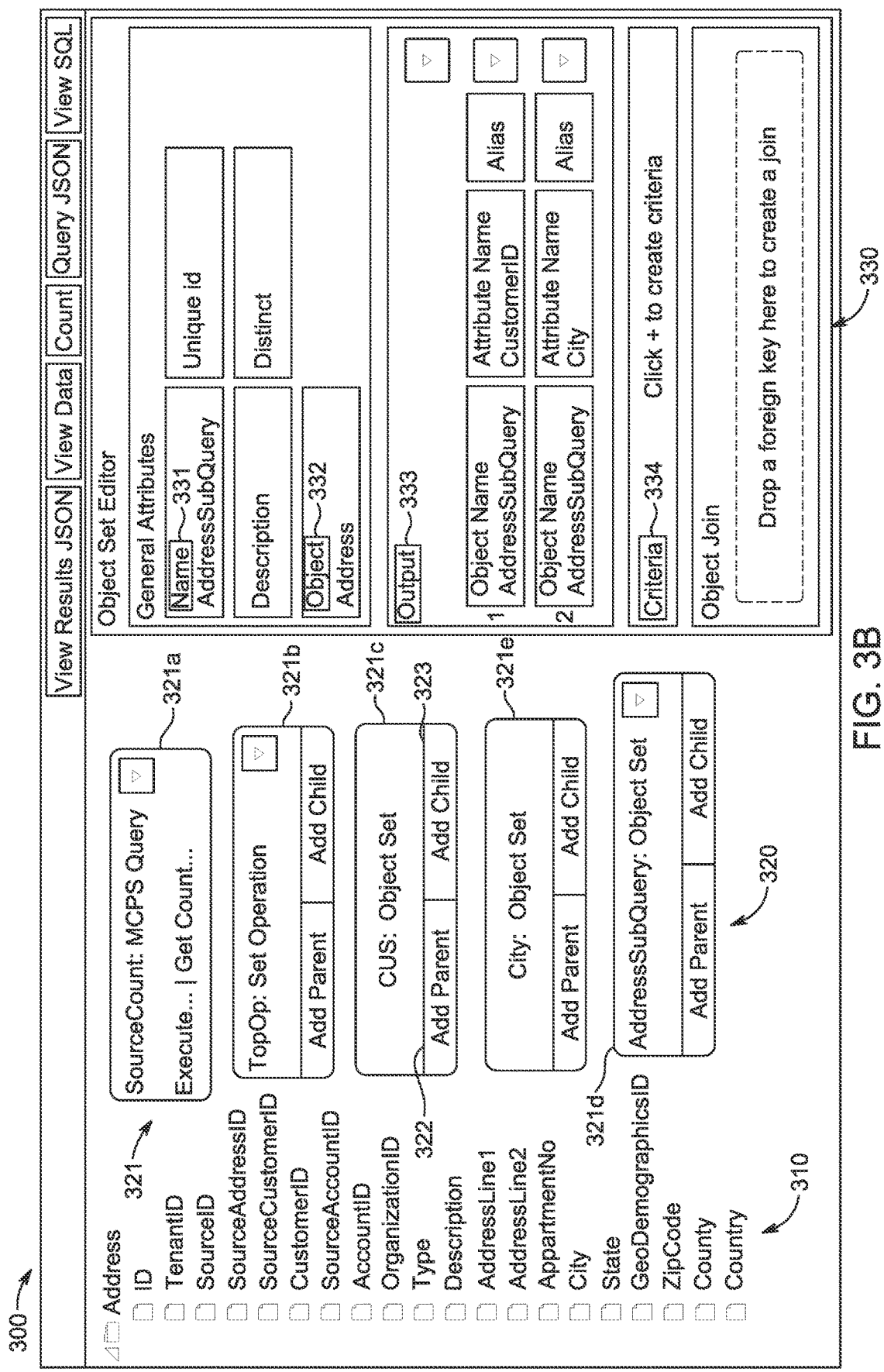

FIGS. 3A and 3B illustrate an example embodiment of a graphical user interface (GUI) for adding parent and child queries to a set of nested queries.

In one or more embodiments, an interactive graphical user interface (GUI) 300 includes a selectable metadata region 310, a nested query display region 320, and a query detail region 330. In one or more embodiments, a system displays one or both of the selectable metadata region 310 and the query detail region 330 simultaneously with the nested query display region 320. Each region 310, 320, and 330 is displayed alongside the other regions, so as not to cover or overlap another region. While the example embodiment of FIGS. 3A and 3B shows the regions side-by-side in a horizontal direction, in an alternative embodiment, one or more regions 310, 320, or 330 may be arranged above or below one or more other regions in a vertical direction.

The nested query display region 320 displays visual representation of a set of nested queries 321. In the example illustrated in FIG. 3A, the visual representation 321a represents a parent query. Visual representation 321b represents a child query of the query represented by the visual representation 321a. Visual representation 321b is also a parent query of a child query represented by the visual representation 321c. The visual representation 321d is a child query of the query represented by the visual representation 321c. In the description that follows, visual representations 321a-321d may be referred to as "queries" for ease of description, even though the visual representations 321a-321d only visually represent queries.

The queries 321a-321d are arranged relative to each other to display a visual indicator of their nested relationships relative to each other. Query 321b is located below, and indented to the right, relative to query 321a to indicate query 321b is a child query of the query 321a. Similarly, query 321c is located below, and indented to the right, relative to query 321b to indicate query 321c is a child query of query 321b. In the present specification and claims, a child query is a query that is configured to begin execution following a start of execution of a parent query. The child query may be referred to as a sub-query and as a nested query. The child query may return one or more results to the parent query. In one or more embodiments, the parent query performs one or more operations on results obtained from one or more child queries and outputs a result to any parent query higher in a query hierarchy.

In one or more embodiments, the query 321c includes a button 322 to add a parent query to the set of nested queries 321. In one or more embodiments, the query 321c further includes a button 323 to add a child query to the set of nested queries 321.

As shown in FIG. 3B, when the system receives an input selecting the "add child" button 323, the system generates a visualization 321e in the nested query display region 320. The query 321e is displayed indented relative to the query 321c to illustrate the query 321e is a child query of the query 321c. The query 321d, which was previously an immediate child query of the query 321c, moves lower in the query hierarchy. The query 321d becomes a child query of the new query 321e.

In one or more embodiments, when the system generates the query 321e, the display in the query detail region 330 changes to illustrate editable fields for the query 321e. For example, the query detail region 330 may include a "name" field 331 to allow to modify the query name. The query detail region 330 may include a "object" field 332 through which the system receives an input selecting an object to be accessed by execution of the query 321e. The query detail region 330 may further display an "output" field 333 through which the system receives an input selecting one or more attributes and/or attribute values to be output from the query 321e. The query detail region 330 may further display a "criteria" field 334 through which the system receives an input selecting one or more criteria, such as Boolean operations, to performed on one or more attributes and/or attribute values as a function of executing the query.

In one or more embodiments, when the system receives an input selecting the "add parent" button 322 or the "add child" button 323, the system displays an editable field in the nested query display region 320 for entering or selecting query characteristics for the new query. For example, the system may display a list of available data objects that may be accessed upon execution of the query. Alternatively, or in addition, a list of query templates may be displayed. The query templates may execute queries on pre-defined objects, and may have pre-defined query criteria and query outputs.

In one or more embodiments, when the system receives an input selecting the "add child" button 323 in the query 321c, the system creates the query 321e and configures the query 321e to receive an input value from the generated child query 321e. In one or more embodiments, the system automatically configures the query 321e to receive the input value from the child query 321e when the system receives an input defining output values of the query 321e. For example, the system may receive an input selecting a data object and attribute values of attributes associated with the data object. The system may then automatically configure the query 321c to receive the output values from the query 321e corresponding to the attribute values defined by the received input. In one or more embodiments, the system generates the child query 321e to have default values. For example, the system may configure the query 321e to be associated with a default data object and to retrieve default records based on default attributes and/or attribute values.

Similarly, in one or more embodiments, when the system receives an input selecting the "add parent" button 322 in the query 321c, the system creates a parent query and automatically configures the parent query to receiving output values from the query 321c.

In one or more embodiments, the system generates JSON data describing the compound query, made up of the set of nested queries, displayed in the nested query display region 320. When the system detects the input selecting the "add child" button 323 in the query 321c, the system updates the JSON data to include the new query and the characteristics that define the new query.

5. Creating New Query by Joining Object to Existing Query

Figure 4A:
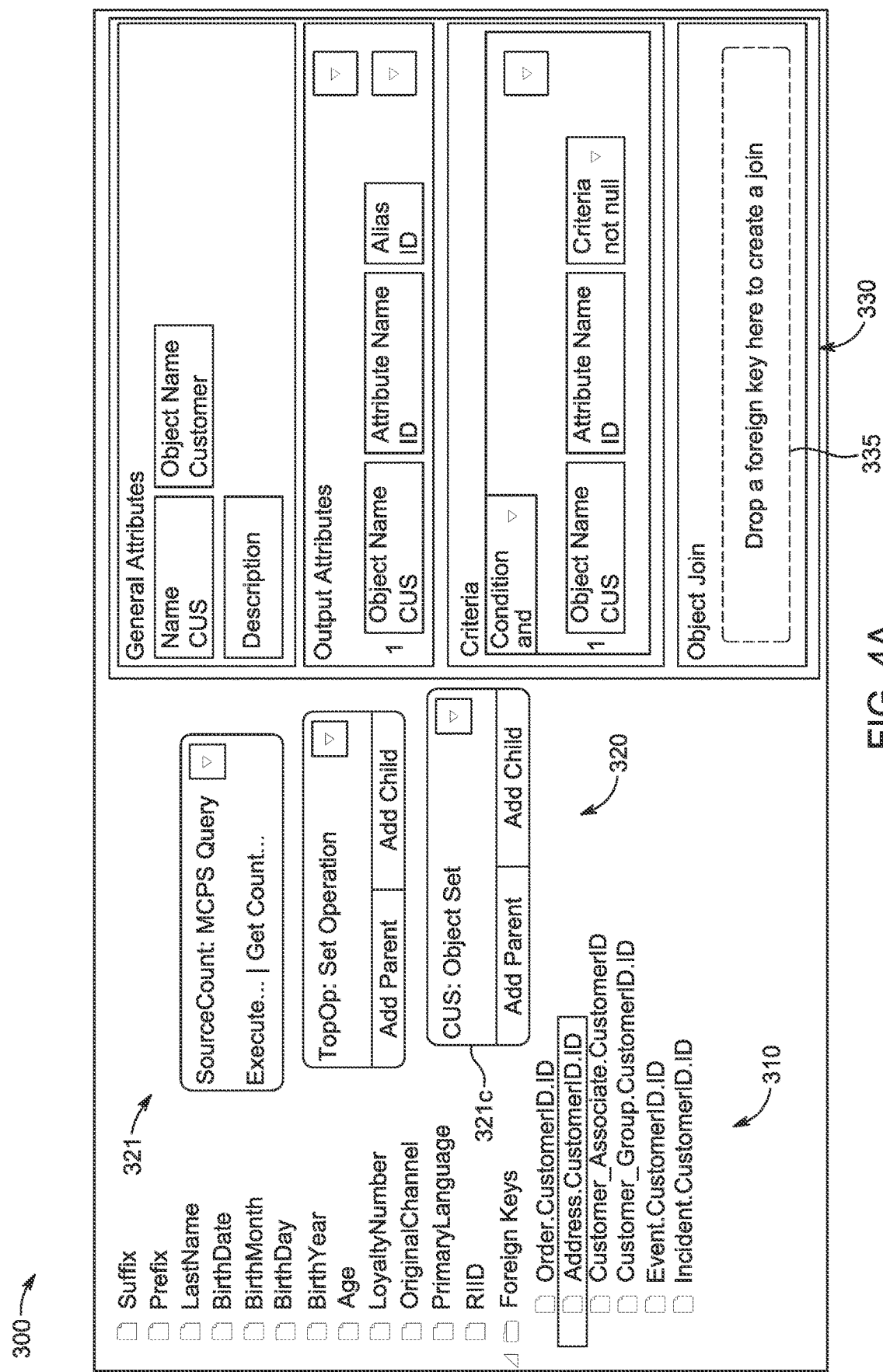
FIGS. 4A and 4B illustrate an example embodiment of creating and displaying a sub-query responsive to an input to a detail region of a user interface.

In one or more embodiments, a system may change the queries displayed in the nested query display region 320 based on receiving inputs in the query detail region 330. As illustrated in FIG. 4A, the query detail region 330 includes a "Join Object" field 335. The "join object" field 335 is an editable field for creating a new sub-query and corresponding visualization in the nested query display region 320.

In particular, when the system receives an input selecting a particular object in the "join object" field 335, the system configures the set of nested queries 321 to include a new sub-query. The nested query display region 320 displays the new sub-query. In one embodiment, the system receives an input selecting a particular object, where the input includes dragging a query template name from the selectable metadata region 310 into the "join object" field 335. In addition, or in the alternative, the system may receive an input selecting an object by typing the name of the object in the "join object" field 335 or by selecting an object name from a drop-down menu.

Figure 4B:
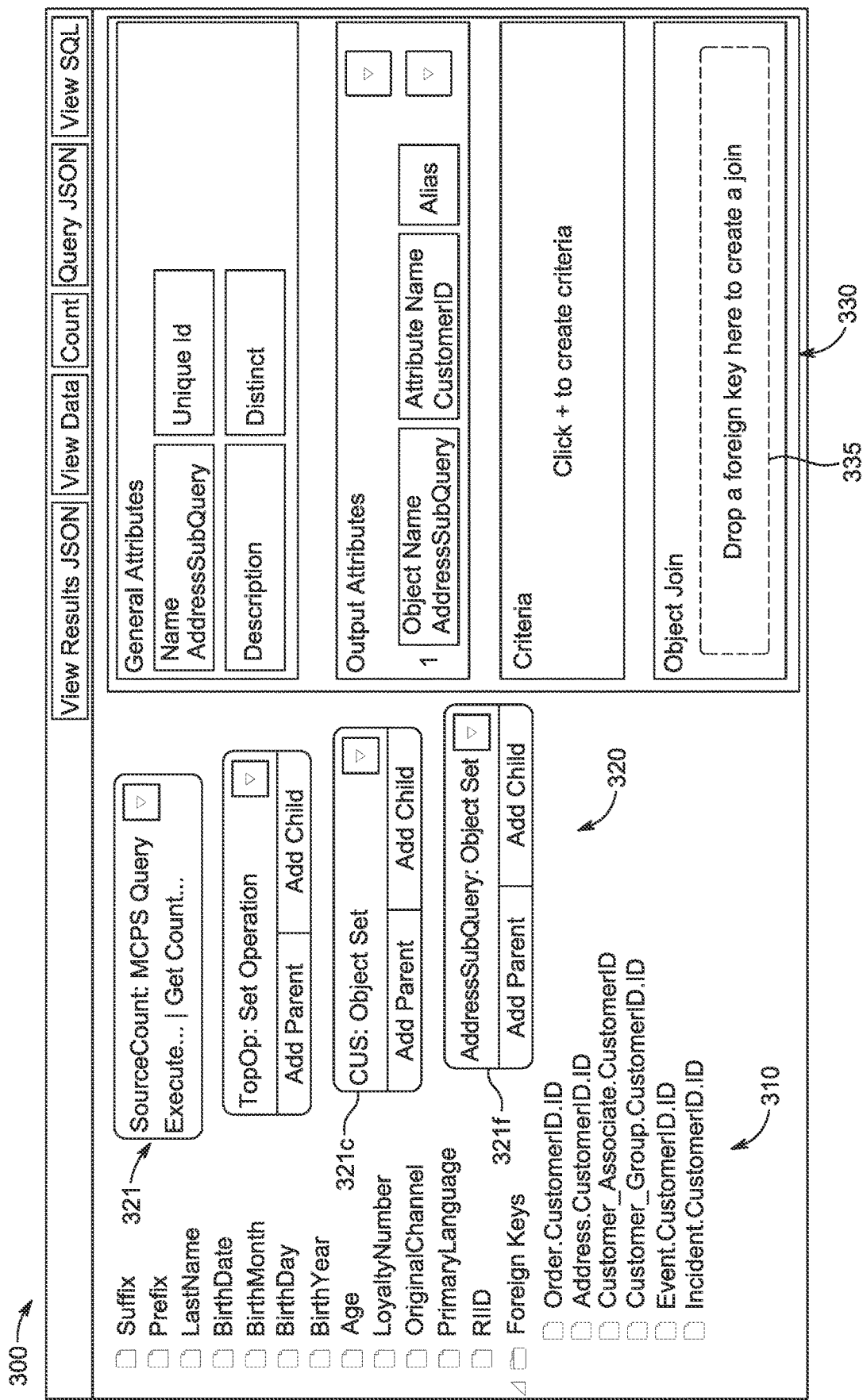

As illustrated in FIG. 4B, when the system detects an input dragging and dropping a foreign key "AddressCusotomerID" from the selectable metadata region 310 into the "join object" field 335, the system automatically generates a visualization of a query 321f in the nested query display region 320. The system automatically configures the query 321f according to one or more default values. For example, if the foreign key "AddressCustomerID" identifies an object "Address" and an attribute in the object "Customer ID," the system automatically configures the query 321f to retrieve entries from the object "Customer ID" having defined values for the "Customer ID" attribute. In one or more embodiments, if a particular attribute does not have a defined value, the system returns any record having any value for the particular attribute.

In one or more embodiments, the system generates JSON data describing the compound query, made up of the set of nested queries, displayed in the nested query display region 320. When the system detects the input dragging and dropping a foreign key "AddressCusotomerID" from the selectable metadata region 310 into the "join object" field 335, the system updates the JSON data to include the new query and the characteristics that define the new query.

Figure 5:
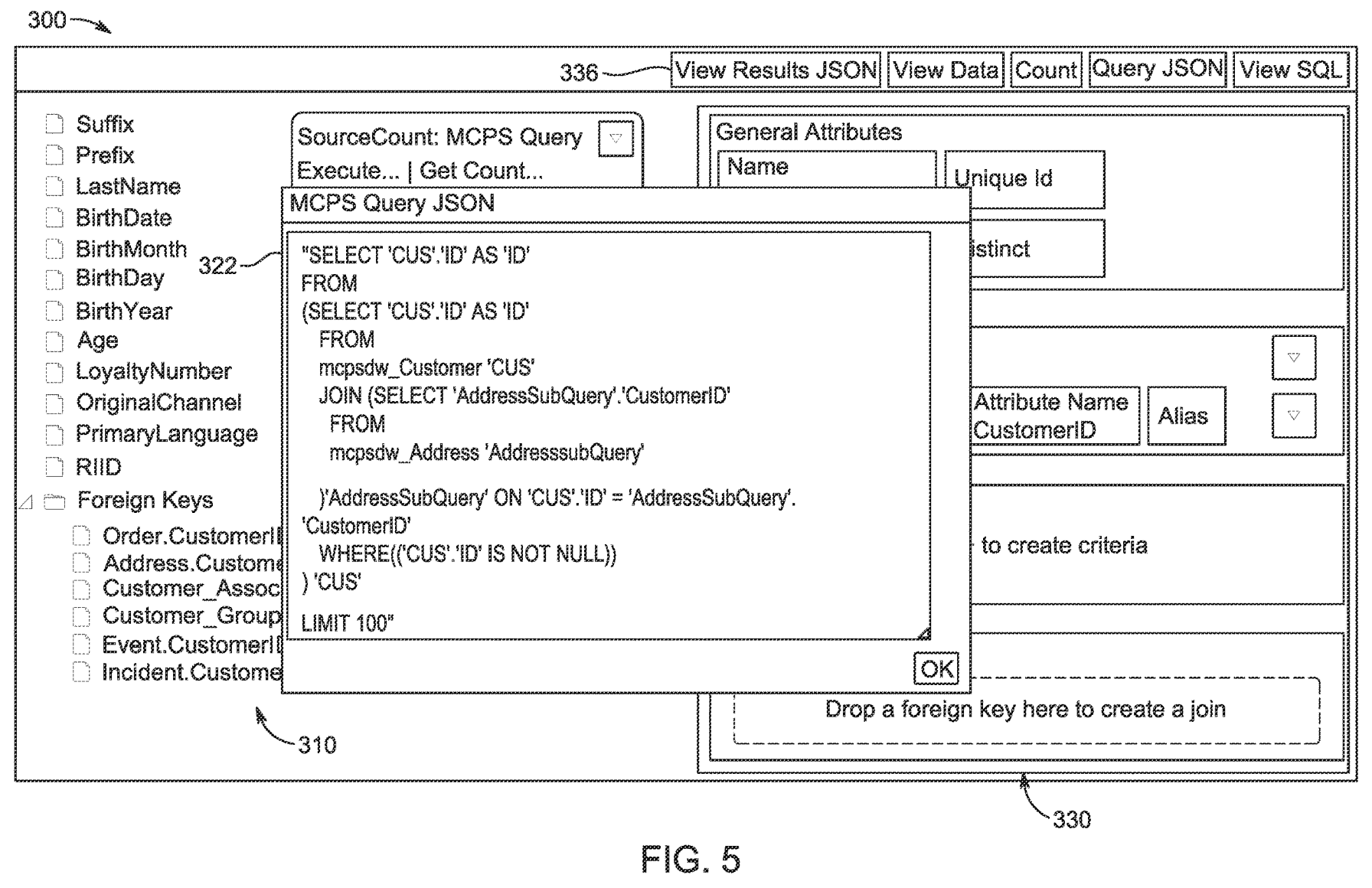

In one or more embodiments, the system receives an input selecting a button 336 to view the JSON data underlying a particular visualization of a query. As illustrated in FIG. 5, when the system receives a selection of the button 336 while the query 321f is selected, the system opens a window 322. In one or more embodiments, when the system receives an input to edit JSON data, the system edits one or both of: (1) the query characteristics displayed in the query detail region 330, and (2) the query characteristics displayed in the nested query display region 320.

6. Presenting Editable Fields for Nested Queries

Figure 6:
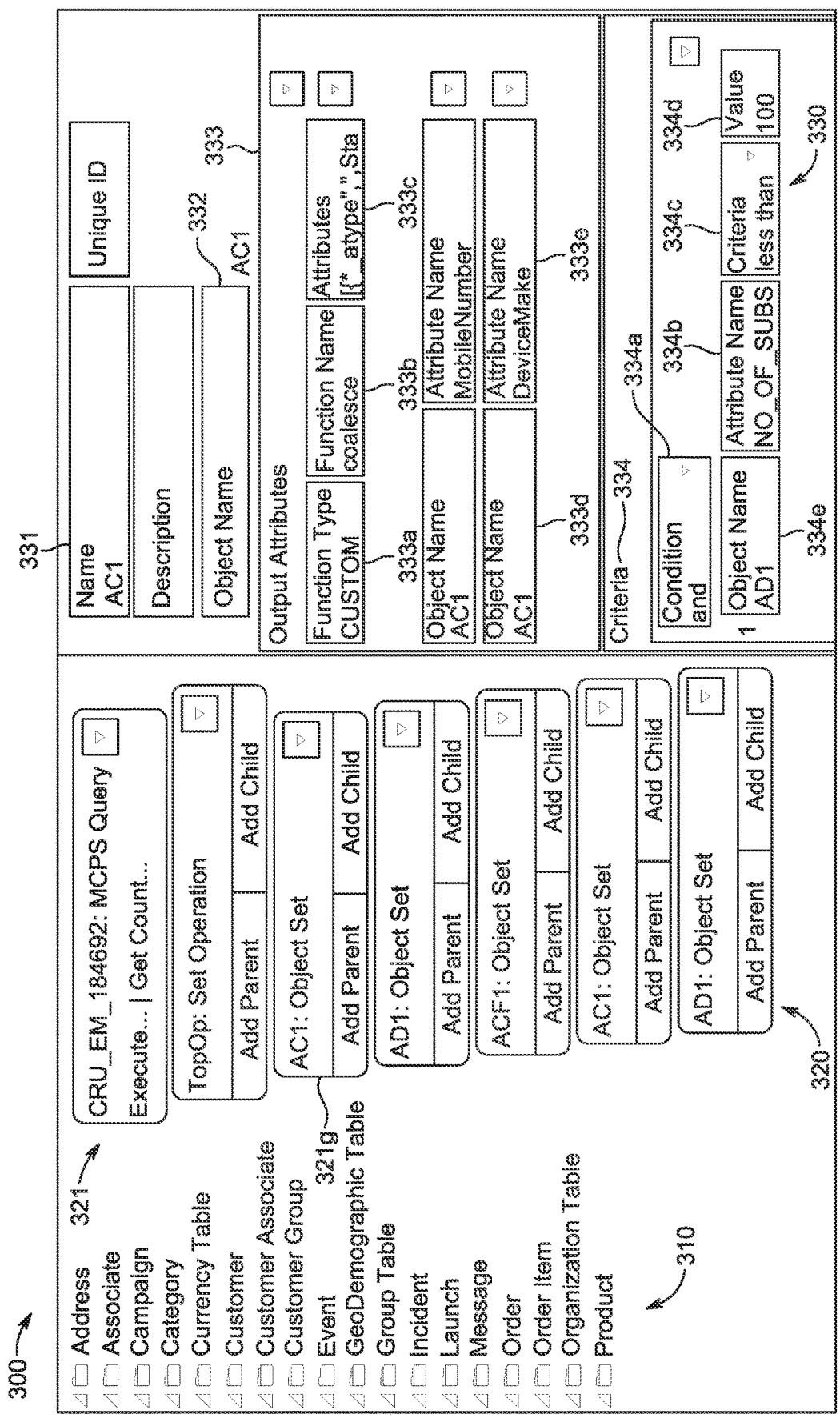
FIG. 6 illustrates an example embodiment of displaying a sub-query detail region alongside a nested query display region of a user interface.

In one or more embodiments, the system modifies the functionality of the user interface according to a selection of a query in the nested query display region 320. When the system receives an input selecting one of the set of nested queries 321 in the nested query display region 320, the query detail region 330 displays editable fields associated with the selected query. If query characteristics associated with another query were previously displayed, the system stops displaying the previously-displayed characteristics. The editable fields are editable to change the characteristics of the selected query. As illustrated in FIG. 6, the query detail region 330 displays editable fields to edit characteristics of the selected query 321g in the nested query display region 320.

As discussed previously, the editable fields include a name field 331 to modify the name of the selected query. The editable fields include an object name field 332 to change an object from which the query, when executed, obtains data. The editable fields include one or more output fields defining data output from the query. The output fields may include a function type field 333a to define the type of a function to be performed on data obtained by the query. A function type may correspond to a template that corresponds to a pre-defined function, pre-defined attributes, and/or pre-defined attribute values. The output fields may include a function name field 333b describing a function to be performed on data obtained by the query. The output fields may include an attributes field 333c defining one or more attributes that are to be operated on by the function defined in the function name field 333b. The output fields may include an object name 333d describing an object from which the query will obtain data. In one or more embodiments, a query may be configured to obtain data from multiple objects and/or other queries. The output fields may include an attribute field 333e associated with the object field 333d. The attribute field 333e defines attributes of the object defined in the object field 333d for which the query will obtain data.

As discussed above, the editable fields include one or more criteria fields. The criteria fields include a condition field 334a defining one or more Boolean functions to be performed on a set of data to filter the set of data. For example, in FIG. 6, the condition field 334a is an "and" condition, meaning the query only obtains values that satisfy each of the defined criteria.

The criteria fields include an object field 334e defining an object from which the query will obtain data. An attribute field 334b defines an attribute in the object 334e for which the query will retrieve data. A criteria field 334c defines a filter applied to attribute values, as defined in the value field 334d to filter the data to be obtained by the query. For example, in FIG. 6, the criteria field 334c defines a "less than" criterion, and the value field 334d defines the value "100." Accordingly, the query will retrieve only records in the object AD1, having the attribute NO_OF_SUBS and an attribute value less than 100. In one or more embodiments, a query may include any number of criteria and conditions.

While FIG. 6 illustrates an embodiment in which multiple characteristics are displayed simultaneously in the query detail region 330, in an alternative embodiment, the query detail region 330 may include selectable user interface elements for selecting a sub-set of characteristics to be displayed in the query detail region 330. For example, a user may select an interface element labeled "Output" to display each output attribute for a particular query. A user may select an interface element labeled "Criteria" to display the criteria applied to the attributes of the query.

7. Generating New Queries Using Selectable Metadata

Figure 7:
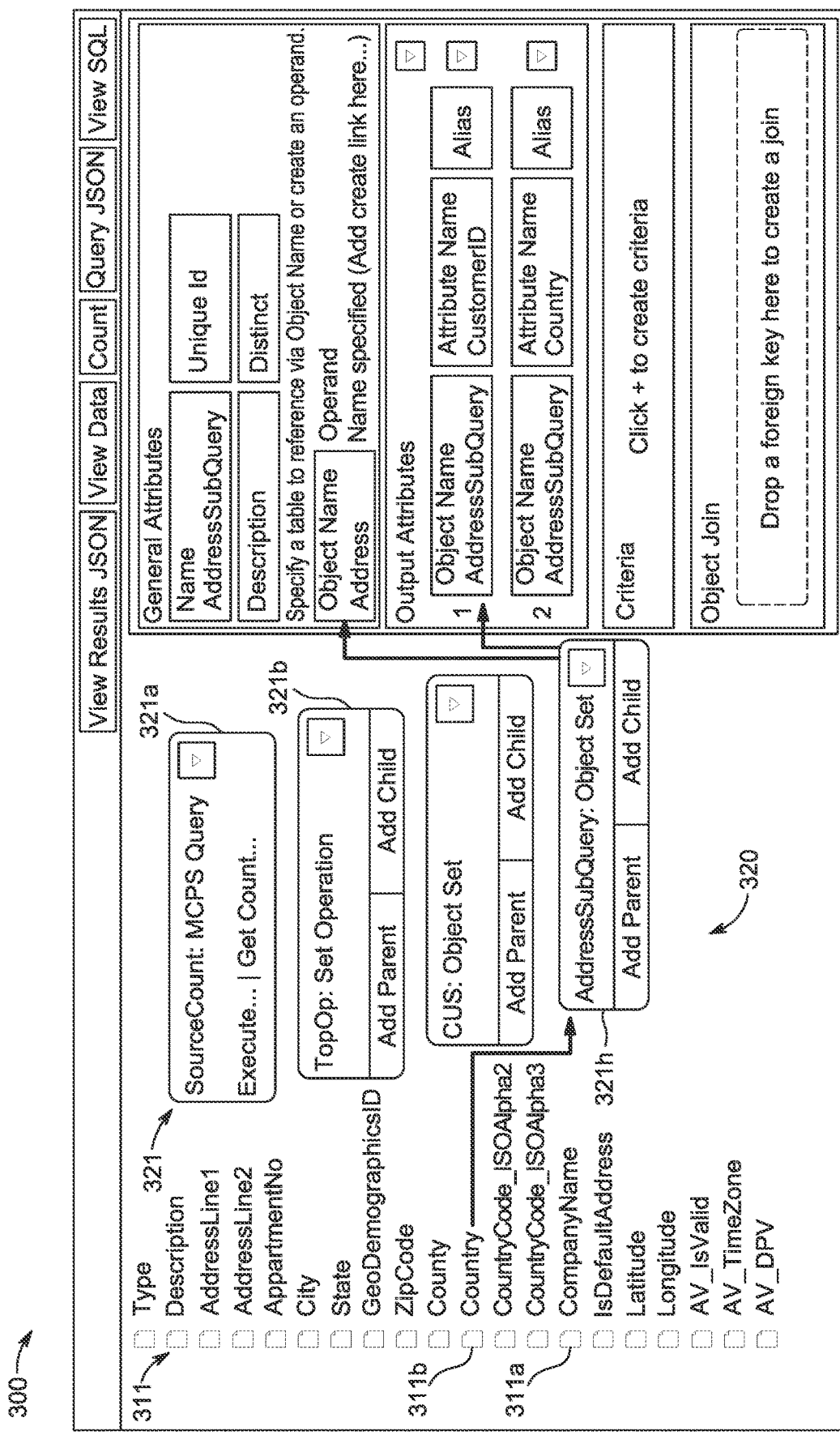
FIG. 7 illustrates an example set of operations for creating and displaying a sub-query responsive to a drag-and-drop action from a list of sets of query metadata into the nested query display region of the user interface.

FIG. 7 illustrates a selectable metadata region 310 displayed together with the nested query display region 320 according to one or more embodiments. The selectable metadata region 310 includes a list of sets of metadata 311. In one embodiment, the set of metadata may be a query template specifying pre-defined values associated with a query. Each set of metadata corresponds to pre-defined query characteristics. For example, a set of metadata may be a query template "CompanyName" 311a that may include predefined values for an object to be accessed by the query, attributes and/or attribute values defining data to be obtained from the object, and criteria defining data to be obtained or output by the query.

In one or more embodiments, the GUI 300 includes the functionality to drag-and-drop a set of metadata from the selectable metadata region 310 into the nested query display region 320. As a result, the system generates a new sub-query in the nested query display region 320 using the metadata associated with the selected set of query metadata. As illustrated in FIG. 7, the system detects a drag-and-drop operation to drag and drop the query template "country" 311b into the nested query display region 320. The system automatically generates the visualization of the query 321h and automatically populates editable fields in the query detail region 330 using the query metadata. For example, the system identifies in the query metadata that the query is associated with the data object "Address," and the query includes output attributes "CustomerID" and "Country." The system automatically assigns the object "address" to the query and automatically generates output attributes of "CustomerID" and "Country" for the query. In addition, the system updates the JSON data associated with the compound query represented by the set of nested queries in the nested query display region 320 to include the new sub-query.

In one or more embodiments, the system detects an input to drag-and-drop a set of query metadata above or below any existing query in the nested query display region 320. The system automatically generates a parent query or a child query, respectively. The system displays the new query with a visual indicator of its relationship to any query above or below the new query in the set of nested queries. For example, if the system detects a drag-and-drop operation to drag-and-drop a set of query metadata between the queries 321a and 321b, the system generates a sub-query that is a child query of the query 321a and a parent query to the query 321b. The system indents the new query relative to the query 321a. The system further indents the query 321b relative to the new query.

The system may automatically configure output attributes of the selected query according to its parent query. For example, if the system generates a new sub-query between an existing parent query and child query, the system may automatically configure the new query to pass through output attributes from the previously-existing child query to the previously-existing parent query. In addition, or in the alternative, the system may give a user an option to modify or alter any output attributes received from a child query and/or passed on to a parent query. The system may automatically apply one or more operations specified by the criteria of the selected set of metadata to input attribute values from a child query. The system may automatically pass the resulting attribute values as output values to any parent query.

In one or more embodiments, the set of metadata may be configured to perform one or both of generating a new query or configuring an existing query. For example, a set of metadata may include only criteria to be applied to an existing query and no data for an "object" field, to allow the set of metadata to be used with a number of different objects. The set of metadata may include a number of different output attributes, output attribute values, and/or criteria that may be applied to different queries. For example, a system may detect a drag-and-drop operation of a set of metadata having values for output attributes that is dragged onto an existing query in the nested query display region 320 to change the attributes and/or attribute values output by the query. Accordingly, complex query operations may be implemented in different queries and in different sets of nested queries by applying query templates to the different queries.

8. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

10. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
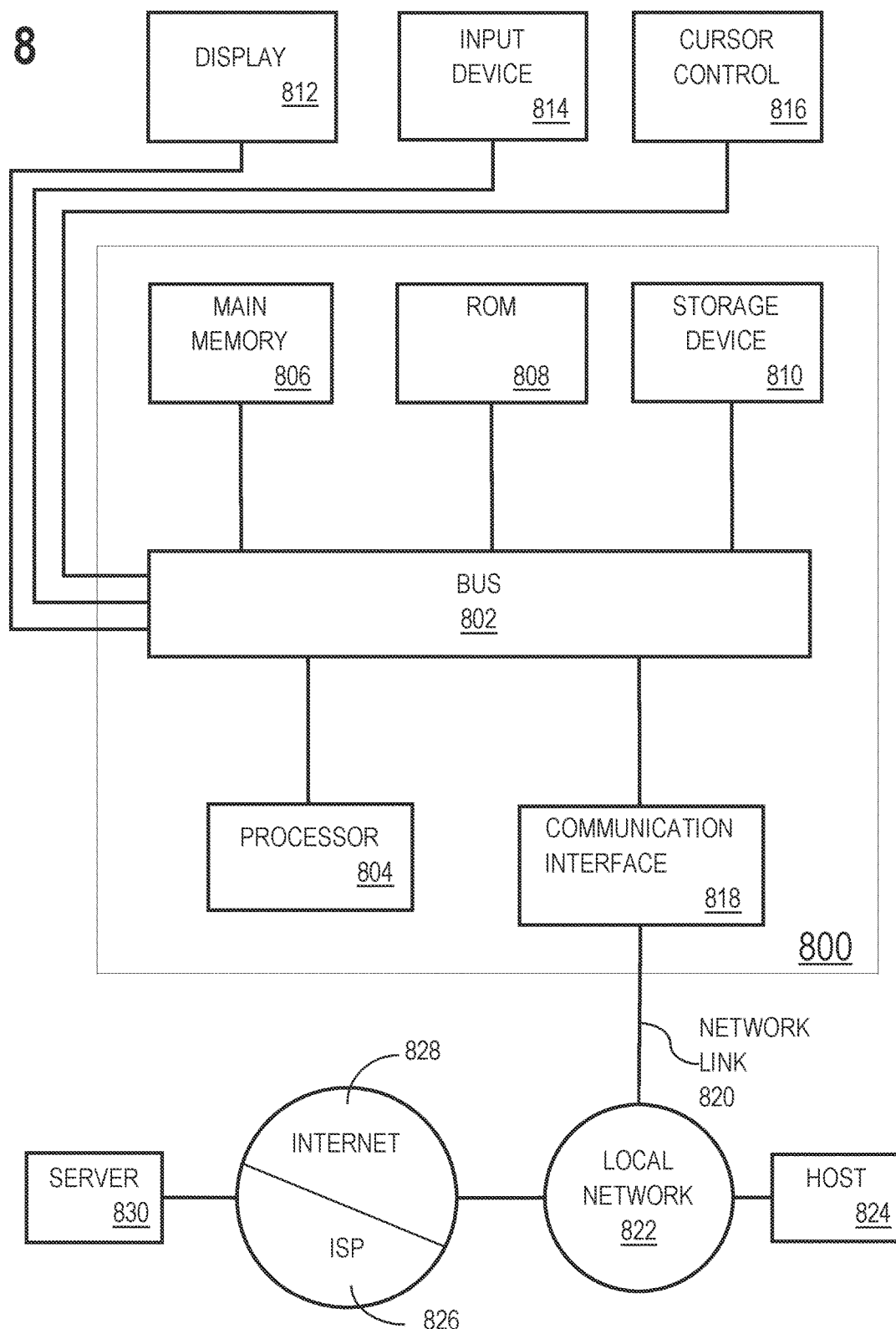
FIG. 8 shows a block diagram that illustrates a computer system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic, or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

displaying, by a graphical user interface (GUI), a first visual representation of a first query, the first query associated with first query information including a first data object from which the first query is configured to retrieve a first set of one or more records based on a first set of one or more attribute values;

concurrently with displaying the first visual representation:

displaying, in a second region of the GUI, a query editor panel displaying a plurality of editable fields specifying characteristics of the first query;

wherein the plurality of editable fields includes a data object entry field for specifying at least one data object to generate a nested query comprising the first query and a second query, the second query comprising a first child query of the first query;

receiving a first input via the data object entry field;

identifying a second data object associated with the first input; and responsive to receiving the first input:

generating a second visual representation of the second query;

configuring the second query to retrieve a set of one or more records from the second data object; and configuring the first query to use a result from an execution of the second query.

2. The non-transitory computer readable medium of claim 1, wherein the operations further comprise:
concurrently with displaying the first visual representation and the query editor panel:
displaying, in a third region of the GUI, a plurality of selectable sets of metadata, wherein the first input comprises selecting a first set of metadata from among the plurality of selectable sets of metadata, wherein the first set of metadata defines a plurality of query characteristics including an identifier for the second data object.

3. The non-transitory computer readable medium of claim 2, wherein the first input comprises dragging and dropping a second interface element representing the first set of metadata from the third region of the GUI into the second region of the GUI.

4. The non-transitory computer readable medium of claim 1, wherein the first input comprises typing a name of the second data object into the data object entry field.

5. The non-transitory computer readable medium of claim 1, wherein configuring the first query to obtain the result from the execution of the second query comprises:
configuring the first query to obtain at least one attribute value from the second query without receiving explicit user input for configuring the first query to obtain the at least one attribute value from the second query.

6. The non-transitory computer readable medium of claim 1, wherein the first visual representation includes a first geometric shape representing the first query, and wherein the query editor is located outside the first geometric shape.

7. The non-transitory computer readable medium of claim 1, wherein the plurality of editable fields further comprises:
a first set of fields displaying one or more attribute names of attributes included in an object associated with the first query; and
a second set of fields displaying one or more criteria applied to one or both of: (a) one or more attributes, and (b) one or more attribute values.

8. A method comprising:
displaying, by a graphical user interface (GUI), a first visual representation of a first query, the first query associated with first query information including a first data object from which the first query is configured to retrieve a first set of one or more records based on a first set of one or more attribute values;
concurrently with displaying the first visual representation:
displaying, in a second region of the GUI, a query editor panel displaying a plurality of editable fields specifying characteristics of the first query;
wherein the plurality of editable fields includes a data object entry field for specifying at least one data object to generate a nested query comprising the first query and a second query, the second query comprising a first child query of the first query;
receiving a first input via the data object entry field;
identifying a second data object associated with the first input; and
responsive to receiving the first input:
generating a second visual representation of the second query;
configuring the second query to retrieve a set of one or more records from the second data object; and
configuring the first query to use a result from an execution of the second query.

9. The method of claim 8, further comprising:
concurrently with displaying the first visual representation and the query editor panel:
displaying, in a third region of the GUI, a plurality of selectable sets of metadata, wherein the first input comprises selecting a first set of metadata from among the plurality of selectable sets of metadata, wherein the first set of metadata defines a plurality of query characteristics including an identifier for the second data object.

10. The method of claim 9, wherein the first input comprises dragging and dropping a second interface element representing the first set of metadata from the third region of the GUI into the second region of the GUI.

11. The method of claim 8, wherein the first input comprises typing a name of the second data object into the data object entry field.

12. The method of claim 8, wherein configuring the first query to obtain the result from the execution of the second query comprises:
configuring the first query to obtain at least one attribute value from the second query without receiving explicit user input for configuring the first query to obtain the at least one attribute value from the second query.

13. The method of claim 8, wherein the first visual representation includes a first geometric shape representing the first query, and
wherein the query editor is located outside the first geometric shape.

14. The method of claim 8, wherein the plurality of editable fields further comprises:
a first set of fields displaying one or more attribute names of attributes included in an object associated with the first query; and
a second set of fields displaying one or more criteria applied to one or both of: (a) one or more attributes, and (b) one or more attribute values.

15. A system comprising:
one or more processors; and
memory storing instructions that, when executed by the one or more processors, cause the system to perform operations comprising:
displaying, by a graphical user interface (GUI), a first visual representation of a first query, the first query associated with first query information including a first data object from which the first query is configured to retrieve a first set of one or more records based on a first set of one or more attribute values;
concurrently with displaying the first visual representation:
displaying, in a second region of the GUI, a query editor panel displaying a plurality of editable fields specifying characteristics of the first query;
wherein the plurality of editable fields includes a data object entry field for specifying at least one data object to generate a nested query comprising the first query and a second query, the second query comprising a first child query of the first query;
receiving a first input via the data object entry field;
identifying a second data object associated with the first input; and
responsive to receiving the first input:
generating a second visual representation of the second query;
configuring the second query to retrieve a set of one or more records from the second data object; and configuring the first query to use a result from an execution of the second query.

16. The system of claim 15, wherein the operations further comprise:
concurrently with displaying the first visual representation and the query editor panel:
displaying, in a third region of the GUI, a plurality of selectable sets of metadata, wherein the first input comprises selecting a first set of metadata from among the plurality of selectable sets of metadata,
wherein the first set of metadata defines a plurality of query characteristics including an identifier for the second data object.

17. The system of claim 16, wherein the first input comprises dragging and dropping a second interface element representing the first set of metadata from the third region of the GUI into the second region of the GUI.

18. The system of claim 15, wherein the first input comprises typing a name of the second data object into the data object entry field.

19. The system of claim 15, wherein configuring the first query to obtain the result from the execution of the second query comprises:
configuring the first query to obtain at least one attribute value from the second query without receiving explicit user input for configuring the first query to obtain the at least one attribute value from the second query.

20. The system of claim 15, wherein the plurality of editable fields further comprises:
a first set of fields displaying one or more attribute names of attributes included in an object associated with the first query; and
a second set of fields displaying one or more criteria applied to one or both of: (a) one or more attributes, and (b) one or more attribute values.

\* \* \* \* \*

UNITED STATES PATENT AND TRADEMARK OFFICE
CERTIFICATE OF CORRECTION

| | | |
|---|---|---|
| PATENT NO. | : 12,259,880 B2 | Page 1 of 1 |
| APPLICATION NO. | : 18/598230 | |
| DATED | : March 25, 2025 | |
| INVENTOR(S) | : Singh et al. | |

It is certified that error appears in the above-identified patent and that said Letters Patent is hereby corrected as shown below:

In the Specification

In Column 1, Line 4, delete "INCORPORTION" and insert -- INCORPORATION --, therefor.

In Column 12, Lines 5-6, delete ""AddressCusotomerID"" and insert -- "AddressCustomerID" --, therefor.

In Column 12, Line 23, delete ""AddressCusotomerID"" and insert -- "AddressCustomerID" --, therefor.

Signed and Sealed this
Seventeenth Day of June, 2025

Coke Morgan Stewart
*Acting Director of the United States Patent and Trademark Office*